Sept. 19, 1967  W. H. GALLOWAY  3,342,511
COUPLING DEVICE FOR TUBULAR MEMBERS
Filed March 8, 1967
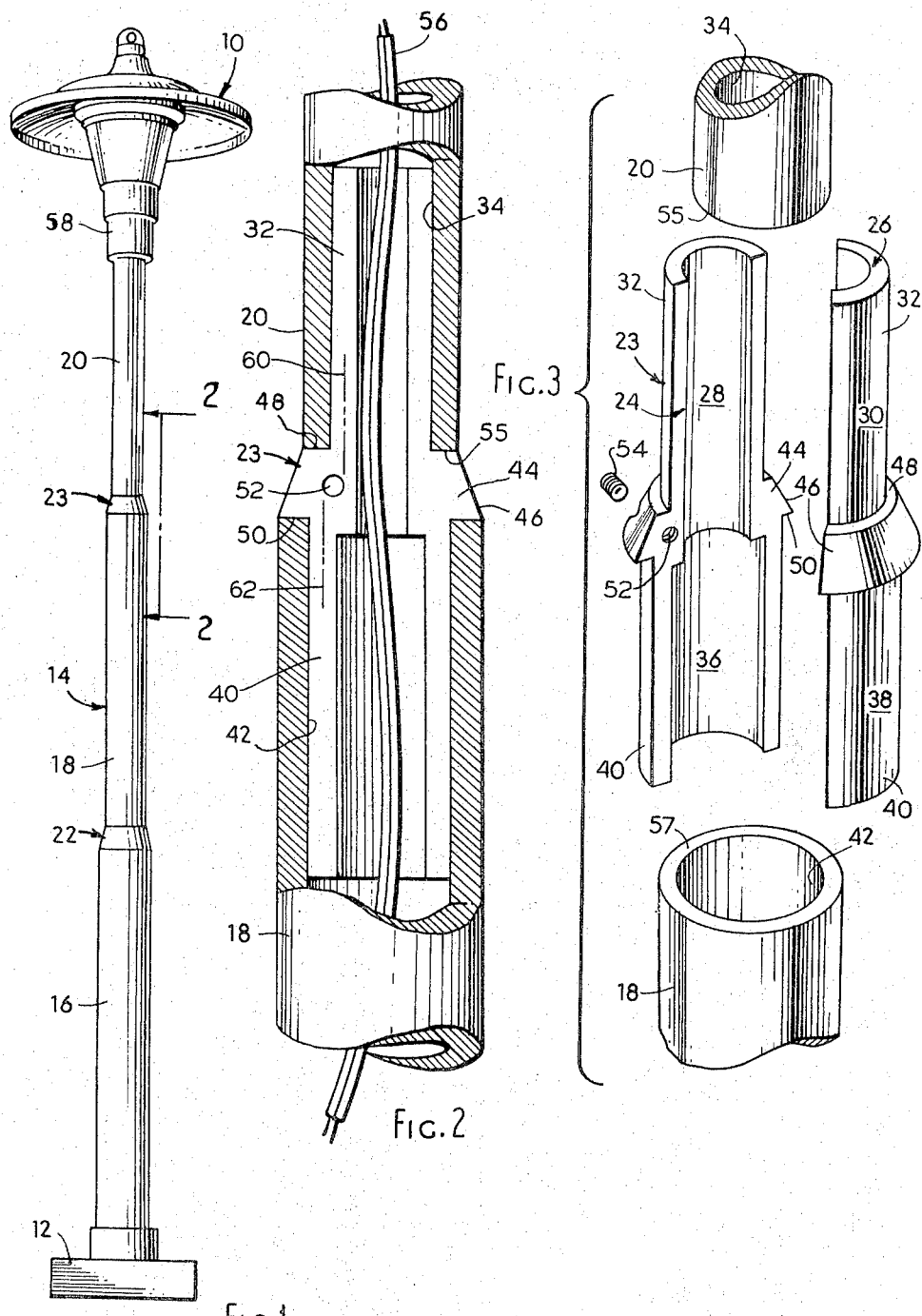
INVENTOR
WILLIAM H. GALLOWAY
BY
Jeffers & Young
ATTORNEYS – # United States Patent Office 3,342,511
Patented Sept. 19, 1967

3,342,511
COUPLING DEVICE FOR TUBULAR MEMBERS
William H. Galloway, 326 Arcadia Court,
Fort Wayne, Ind. 46807
Filed Mar. 8, 1967, Ser. No. 621,591
3 Claims. (Cl. 285—177)

ABSTRACT OF THE DISCLOSURE

Two tubular members are joined in an end-to-end relation by a coupling device which is cylindrical in shape and formed in two longitudinal halves. The ends of the coupling device are inserted in the ends of the two tubular members. The coupling device is expanded outward by a screw that is threaded in one half and that presses against the other half so as to force the coupling device halves outward against the interior of the tubular members and frictionally engage them.

This application is a continuation-in-part of my presently pending application entitled "Coupling Device for Tubular Members," filed Jan. 28, 1965, Ser. No. 428,730, now abandoned

Background of the invention

My invention relates to a coupling device for tubular members, and particularly to such a coupling device for tubular members having different diameters. More particularly, my invention relates to a coupling device for tubular conduit or pipe which is used for poles or standards that support objects or lighting units designed for outdoor use. Such uses may include lighting for residences, industries, streets, golf courses, driving ranges, motels, shopping centers, parking areas, schools, playgrounds and stadiums, or flag poles, or sign posts. Such uses may require or need a pole height that is greater than the length of a single pole that can be conveniently shipped, or that is greater than can be practically provided by a single pole of one diameter. As an example of previous arrangements, if a ten-foot mounting pole is needed for a light, a three-inch inside diameter tube six feet long can be used with a three-inch outside diameter tube five feet long to obtain the desired height. The three-inch outside diameter tube is inserted into the three-inch inside diameter tube so that the two tubes overlap one foot. The tubes are then bolted or welded together to form the desired ten-foot pole. This arrangement requires an assembly that is time consuming and that is sometimes impractical to accomplish on the job or location. In addition, the welding between the two tubes is unsightly and forms an uneven and unsightly offset at the point where the tubes change sizes.

Accordingly, an object of my invention is to provide a coupling for joining two tubes of selected diameters, the coupling being comparatively inexpensive to manufacture.

Another object of my invention is to provide a coupling device for two tubular members of different diameters, the coupling device being easy to use, reliable, and pleasing in appearance.

Summary of the invention

Briefly, these and other objects are achieved in accordance with my invention by a coupling device which is generally cylindrical in shape and formed in two longitudinal halves. The two halves are substantially similar, and have a first outer diameter portion, an intermediate portion, and a second outer diameter portion. Each of the junctions of the intermediate portion with the first diameter portion and with the second diameter portion comprises a shoulder against which a tubular member abuts when it is slipped over its respective portion. The two shoulders so provided are joined by a sloped or tapered portion which provides a smooth and attractive transition between the first diameter portion and the second diameter portion. One of the two halves is provided with a threaded hole in the intermediate portion, this hole being centered radially mid-way between the radial center of the first diameter portion and the radial center of the second diameter portion. A set screw or other type of machine screw is threaded into this hole. With the halves in assembled relation, the tubular members are positioned over their respective portions. The screw is threaded against the other half of the coupling device to cause the halves of the coupling member to be forced apart. Since the screw is positioned mid-way between the radial centers of the two portions, it provides equal force on both halves and causes the coupling member to expand outward. As the coupling member expands outward, it frictionally engages the interiors of the two tubular members to be joined, and holds the tubular members in a rigid and tight relation.

Brief description of the drawing

The subject matter which I regard as my invention is particularly pointed out and distinctly claimed in the claims. The structure and operation of my invention, together with further objects and advantages, may be better understood from the following description given in connection with the accompanying drawing, in which:

FIGURE 1 shows a lighting unit mounted on a pole constructed with a coupling device in accordance with my invention;

FIGURE 2 is an enlarged cross-sectional view taken along the lines 2—2 and showing a portion of the pole of FIGURE 1; and FIGURE 3 is an exploded perspective view showing the construction and arrangement of my coupling device.

Description of the preferred embodiment

FIGURE 1 shows a typical lighting unit 10 mounted on a pole 14 assembled or constructed with a coupling device in accordance with my invention. Such a lighting unit 10 can be utilized in many areas. A similar construction can be used to provide an elevated pole for supporting other objects, such as a flag. The pole 14 is mounted on a base 12, and includes three pole sections 16, 18, 20 which are tubular in shape. Three sections 16, 18, 20 are used as it is easier to ship and store shorter sections rather than one long section. Generally, the lowest pole section 16 has the largest diameter which, in this embodiment, might be three inches. The second section 18 is smaller, and might have a diameter of two and one half inches. The section 18 is mounted above and joined to the section 16 by a coupling device 22 in accordance with my invention. The third section 20 is mounted on the second section 18 by a coupling member 23 in accordance with my invention. The third section 20 has a still smaller diameter which might be two inches. The light 10 comprises a sleeve 58 which has an internal diameter that fits over the outside diameter of the pole section 20, and is held thereto by any suitable means. The sections 16, 18, 20 and the coupling members 22, 23 are hollow in order that electrical wires or cables may be passed through the base 12, and upward through the pole 14 to be connected to the lighting unit 10. The coupling members or devices 22, 23 are substantially identical except for dimensional variations which are arranged to assemble or join the desired sizes of pole sections. Therefore, only the coupling member 23 will be described in detail, as it is to be understood that the coupling member 22 has substantially the same configuration and arrangement.

With reference to FIGURES 2 and 3, the coupling member or device 23 has a generally cylindrical shape and is longitudinally divided to provide two substantially identical halves or locking sections 24, 26. Each of the locking sections 24, 26 is provided with a respective, elongated, semi-cylindrical upper portion 28, 30 formed by a wall 32. The outside surface of the wall 32 has a diameter that is slightly smaller than the interior or inside diameter 34 of the tubular pole section 20. Likewise, each of the locking sections 24, 26 has a respective, elongated, semi-cylindrical lower portion 36, 38 formed by a wall 40. The outside surface of the wall 40 has a diameter that is slightly smaller than the inside diameter 42 of the pole section 18. The coupling member 23 is provided with an intermediate portion 44 formed by shoulders or rims 48, 50 adjacent the upper portions 28, 30 and the lower portions 36, 38 respectively. Outside diameters or edges of these shoulders 48, 50 are joined by a tapered or sloping surface 46 which provides a gradual and preferably pleasing transition between the two diameters.

The intermediate portion 44 of one of the locking sections, in FIGURES 2 and 3 the locking section 24, is provided with a threaded hole 52 which receives a threaded set screw 54. As best seen in FIGURE 2, the hole 52 has its inner point of emergence centered or located mid-way between the centers 60, 62 of the walls 32, 40 respectively. This location of the hole 52 insures equal transmission of force to both upper portions 28, 30 and to both lower portions 36, 38. The axis of the hole 52 is tangential to its point of emergence from the interior face of the intermediate section 44. That is, the axis of the hole 52 is perpendicular to the plane surface at this point of emergence. This construction insures that the set screw 54 presses against the center point relative to the walls 32, 40 of the outer locking section 26.

When the coupling member or device 23 is utilized, the pole sections 18, 20 are cut to a predetermined length depending upon the height desired for the lighting unit 10. Both locking sections 24, 26 of the coupling member 23 are positioned face to face so as to provide a substantially cylindrical outer surface with the intermediate sloping surface 46 between them. The pole section 20 is then slipped over the upper portions 28, 30, and the pole section 18 is slipped over the lower portions 36, 38 until their ends 55, 57 respectively abut the shoulders 48, 50. If the surfaces of the shoulders 48, 50 are oriented to be parallel to the ends 55, 57 of the pole sections 20, 18, a tight fit is insured. As shown in FIGURES 2 and 3, the shoulders 48, 50 and the ends 55, 57 all lie in planes that are perpendicular to the longitudinal axis of the structure. A watertight structure is thus provided, and very little water pressure is exerted on the cracks because of the downward and outward slope of the tapered surface 46. The set screw 54 is then turned or operated so as to press against the interior face of the locking section 26. As the screw 54 presses against this face, it causes the two locking sections 24, 26 to separate from each other along their longitudinal facings nearest the set screw 54. Because the set screw 54 and its threaded hole 52 are centered between the walls 32, 40, equal pressure is distributed to both the upper portions 28, 30 and to the lower portions 36, 38. As the two locking sections 24, 26 are so separated, their outer cylindrical surfaces frictionally engage the inner cylindrical surfaces of the pole sections 20, 18 and tightly clamp the pieces together. It is to be noted that substantially all of the outer surfaces of the locking sections 24, 26 engage or come into contact with the interior surfaces of the pole sections 18, 20. The pole section 18 is joined to the pole section 16 in a like manner utilizing the coupling member 22. After the sections are assembled, an electrical line 56 may then pass through the assembled sections and connected to the lighting unit 10. The lighting unit 10 is then mounted on the pole section 20 by the sleeve 58. Or, if desired, the lighting unit 10 may be connected directly with or be a part of the tubular member 20.

It will thus be seen that my invention provides an improved coupling member or device which permits ready assembly of tubular sections. The tubular sections may have the same diameter, or may have different diameters. The coupling device in accordance with my invention provides equal stress to both its upper and its lower portion, and assures a tight and equal pressure on all surfaces of the two tubular members joined. Persons skilled in the art will appreciate that modifications can be made. For example, there is no limit to the number of coupling devices which can be used, and there is no limit to the size of the coupling members. Likewise, the sloping portion of the intermediate section may take various angles, depending upon the desired appearance and also upon the shoulder width and the relative diameters of the pole sections joined. Therefore, while my invention has been described with reference to a particular embodiment, it is to be understood that modifications may be made without departing from the spirit of the invention or from the scope of the claims.

What I claim as new and desire to secure by Letters Patent of the United States is:

1. A coupling device for first and second tubular members having first and second respective inside diameters, comprising:
  (a) first and second substantially similar locking sections;
  (b) each of said locking sections having first and second semi-cylindrical portions with respective first and second wall thicknesses;
  (c) each of said first semi-cylindrical portions having a first outside diameter that is slightly less than said first inside diameter of said first tubular member, and each of said second semi-cylindrical portions having a second outside diameter that is slightly less than said second inside diameter of said second tubular member;
  (d) each of said locking sections having an intermediate portion between said first and second semi-cylindrical portions;
  (e) each of said intermediate portions having a semi-cylindrical shape that varies in outside diameter between said first outside diameter of said first semi-cylindrical portion and said second outside diameter of said second semi-cylindrical portion;
  (f) and said intermediate portion of one of said locking sections having a threaded opening for receiving a screw therein, the axis of said threaded opening being substantially a cord of a great circle located in said intermediate portion and disposed normal to the surface at its inner point of emergence, said point being centered between the radial centers of said first and second wall thicknesses of said one locking section, said threaded opening passing completely through the wall of one of said intermediate sections so that said screw may be threaded into said opening from the outer surface of said intermediate portion and engage the other of said locking sections to cause said locking sections to separate and engage the interiors of said tubular members over substantially the entire outer surface of said first and second semi-cylindrical portions, said intermediate portion of each of said locking sections has a first shoulder adjacent said first semi-cylindrical portion and a second shoulder adjacent said second semi-cylindrical portion, each of said shoulders having a surface lying in a plane that is substantially perpendicular to the longitudinal axis of said coupling device.

2. The coupling device of claim 1 wherein each of said locking sections is provided with an interior longitudinal recess which, when assembled with the other of said locking sections, provides an opening for an electrical cable to pass longitudinally therethrough.

3. The coupling device of claim 2 wherein each of said first semi-cylindrical portions having a first outside diameter that is in close tolerance with respect to said first inside diameter of said first tubular member, and each of said second semi-circular portions having a second outside diameter that is in close tolerance with respect to said inside diameter of said second tubular member.

No references cited.

CARL W. TOMLIN, *Primary Examiner.*

D. W. AROLA, *Assistant Examiner.*